March 27, 1951 W. H. G. SLAYMAKER 2,546,909
WHEEL ATTACHMENT FOR VEHICLE JACKS
Filed June 11, 1947
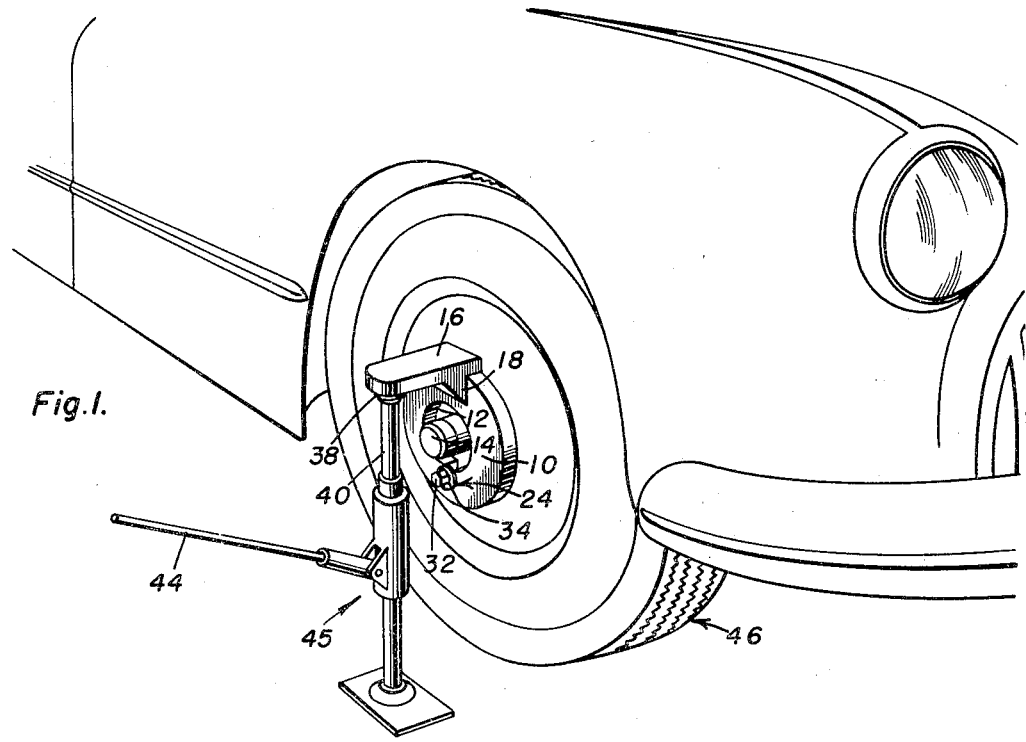
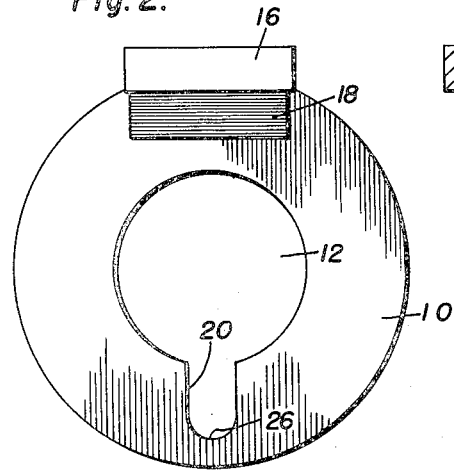
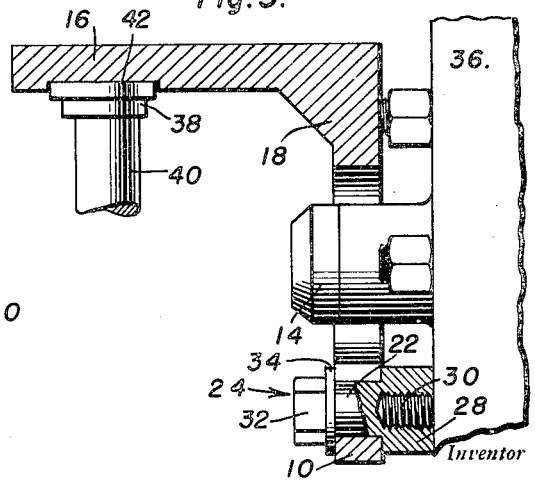
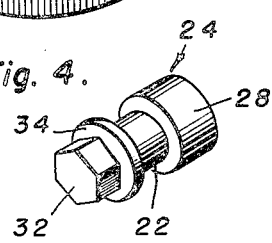
Inventor
William Henry George Slaymaker
By Clarence A. O'Brien
and Harvey B. Jacobson
Attorneys Patented Mar. 27, 1951

2,546,909

UNITED STATES PATENT OFFICE 2,546,909

WHEEL ATTACHMENT FOR VEHICLE JACKS

William Henry George Slaymaker, Holland, Ohio

Application June 11, 1947, Serial No. 753,868

3 Claims. (Cl. 254—133)

This invention relates to new and useful improvements in vehicle jacks and more particularly to a wheel attachment for vehicle jacks.

The primary object of the present invention is to provide a device that permits a vehicle wheel to be raised by a jack without the operator having to climb under a wheel to apply the same.

Another important object of the present invention is to provide a wheel attachment for vehicle jacks that is quickly and readily applied to the wheel in the minimum time.

A further object of the present invention is the provision of a device for the foregoing purposes that embodies novel and improved means for attaching the same onto one of the lugs carried by the wheel assembly.

A still further aim of the present invention is to provide a wheel attachment for jacks that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the present invention in use;

Figure 2 is a front elevational view of the present invention, the lug engaging member removed therefrom;

Figure 3 is a fragmentary side elevational view of the present invention applied to a wheel assembly with parts of the wheel assembly and wheel attaching device broken away and shown in section; and, Figure 4 is a perspective view of the lug engaging member.

Referring now to the drawings in detail, wherein for the purpose of illustration, there is disclosed a preferred embodiment of the present invention, the numeral 10 represents a substantially circular anchor plate provided with a central cut out portion 12 to receive a vehicle hub 14.

Integrally formed with the plate 10 or added as a separate part thereto is an extension 16, the axis of which is at right angles to the axis of the anchor plate. This extension is provided with an inclined bracing portion 18 preferably integral with the plate and the extension.

A radial notch 20 is provided in the plate to engage the central reduced portion 22 of a lug engaging member 24. This portion 22 is preferably cylindrical to engage the rounded outermost portion 26 of the notch 20 in such a manner that portion 22 may rotate therein. At the inner end of member 24 is provided an internally threaded sleeve 28 that receivably engages one of the wheel lugs 30. A preferably hexagonal nut 32 is integrally formed at the outer end of member 24 for engagement with a lug wrench or the like (not shown) and a washer 34 loosely mounted on portion 22 bears against the outer face of plate 10 when member 24 is in position to the plate.

In practical use of the device, one nut of one of the lugs 30 is removed and the anchor plate being disposed vertically is slipped over the wheel hub 14. Member 24 is rotated by a lug wrench or the like, so that sleeve 28 engages preferably the lower lug extending through the wheel hub plate 36 with the inner face of the anchor plate bearing against the terminal portion of the other lugs and extension 16 being disposed in a horizontal plane.

The head portion 38 of a screw post 40 is then recessed in a seat 42 provided in the underside of extension 16 and as the lever 44 of the jack 45 is raised and lowered to feed or raise the post 44, the wheel 46 is raised from the ground level.

A block or other such means may then be placed under the wheel axle or the bumper to retain the vehicle wheel in a raised position as the jack and plate are removed from the wheel hub so that the wheel may be disengaged for replacement or repair.

This device is particularly useful when the footing beneath the vehicle is poor for an axle jack whereby the operator may apply the foregoing structure without having to climb under the vehicle to cause injury to himself or his clothes.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. In combination with a vehicle wheel assembly including wheel lugs carried thereby, an anchor plate having a wheel hub receiving opening therein, a lug engaging member rotatably carried by said plate and forming the sole means for attaching the anchor plate to the wheel assembly, and a jack engaging arm fixed to said plate and disposed perpendicular to said plate, said lug engaging member including an internally threaded socket and a multi-sided head portion, said member being removable from said plate.

2. In combination with a vehicle wheel assembly including wheel lugs carried thereby, an anchor plate having an annular opening therein receiving the hub of the wheel, a radial slot provided in said plate communicating with the opening, said slot having a rounded edge, a cylinder rotatably engaging the rounded edge of said slot, an internally threaded socket fixed to one end of said cylinder and receivably engaging a selected one of said lugs, a multi-sided head carried by the remaining end of the cylinder, and an arm fixed to said plate and projecting outwardly at right angles thereto for engaging a jack, said anchor plate resting against the outer ends of all of said lugs except said selected one of said lugs, said cylinder and said socket constituting sole means for attaching the anchor plate to the wheel assembly.

3. In combination with a vehicle wheel assembly including a plurality of circumferentially spaced wheel lugs one of which is a lower lug, an anchor plate having an opening therein receiving the hub of the wheel, a radial slot provided in said plate communicating with the opening, said slot having a rounded edge, a cylinder rotatably received in the slot and engaging the rounded edge of said slot, an internally threaded socket at one end of said cylinder receivably engaging the lower lug, said anchor plate bearing against the outer ends of said plurality of lugs except said lower lug, a multi-sided head at the other end of said cylinder, and an arm fixed to said plate projecting outwardly at right angles thereto, said arm having a recess therein for receiving a jack screw.

WILLIAM HENRY GEORGE SLAYMAKER.

REFERENCES CITED

The following references are of record in the file of this patent:

UNITED STATES PATENTS

| Number | Name | Date |
|---|---|---|
| 1,750,663 | Dart | Mar. 18, 1930 |
| 2,073,012 | Hunter | Mar. 9, 1937 |
| 2,239,729 | Mizer | Apr. 29, 1941 |
| 2,422,144 | Stevens | June 10, 1947 |